US008223676B2

(12) United States Patent
Lin

(10) Patent No.: US 8,223,676 B2

(45) Date of Patent: Jul. 17, 2012

(54) WIRELESS TRANSMISSION SYSTEM AND A METHOD THEREOF

(75) Inventor: Yung-Sen Lin, Taipei Hsien (TW)

(73) Assignee: Acer Inc., Taipei Hsien (TW)

(*) Notice: Subject to any disclaimer, the term of this patent is extended or adjusted under 35 U.S.C. 154(b) by 609 days.

(21) Appl. No.: 12/390,535

(22) Filed: Feb. 23, 2009

(65) Prior Publication Data

US 2009/0154383 A1 Jun. 18, 2009

(30) Foreign Application Priority Data

Oct. 31, 2008 (TW) ............................... 97142230 A

(51) Int. Cl.
*H04W 4/00* (2009.01)

(52) U.S. Cl. ....................................... 370/310; 370/338

(58) Field of Classification Search ........................ None
See application file for complete search history.

(56) References Cited

U.S. PATENT DOCUMENTS 6,085,241 A * 7/2000 Otis ............................. 709/223
6,542,490 B1 * 4/2003 Ahmadvand et al. ......... 370/338
7,499,460 B2 * 3/2009 Csapo ........................... 370/401
7,656,842 B2 * 2/2010 Thomas et al. ............... 370/334
7,762,470 B2 * 7/2010 Finn et al. ..................... 235/492
7,920,496 B2 * 4/2011 Mahany et al. ............... 370/310
7,933,255 B2 * 4/2011 Li ................................ 370/339
2003/0147368 A1 * 8/2003 Eitan et al. .................... 370/338
2006/0276132 A1 * 12/2006 Sheng-Fuh et al. .......... 455/41.2
2007/0019642 A1 * 1/2007 Lu et al. ........................ 370/389
2007/0281617 A1 * 12/2007 Meylan et al. ............... 455/41.2
2008/0102886 A1 5/2008 Sakurada
2008/0232338 A1 * 9/2008 Ji et al. .......................... 370/338
2008/0298352 A1 * 12/2008 Yang ............................ 370/356
2009/0092114 A1 * 4/2009 Feher ............................ 370/338
2009/0172759 A1 * 7/2009 Jung ............................. 725/111
2010/0118853 A1 * 5/2010 Godfrey ........................ 370/338

* cited by examiner

*Primary Examiner* — Min Jung

(74) *Attorney, Agent, or Firm* — Alan Kamrath; Kamrath IP Lawfirm, PA

(57) ABSTRACT

A wireless transmission system includes a control unit, a first transmission unit, a second transmission unit, a plurality of switches, and a plurality of RF ends. The first transmission unit includes a first transceiver module and a first MAC module. The second transmission unit includes a second transceiver module and a second MAC module. The plurality of RF ends has a plurality of streams for transmitting a wireless signal. The control unit controls the plurality of switches to connect the first transmission unit and the second transmission unit respectively with the plurality of RF ends to distribute the plurality of streams, and controls the first transceiver module and the second transceiver module to manage the plurality of streams.

10 Claims, 4 Drawing Sheets

WIRELESS TRANSMISSION SYSTEM AND A METHOD THEREOF

BACKGROUND OF THE INVENTION

1. Field of the Invention

The present invention relates to a wireless transmission system and a method thereof, and more particularly, to a wireless transmission system which can distribute streams and a method thereof.

2. Description of the Related Art

As technology advances, wireless communication technologies now offer higher transmission speeds than ever. For example, the transmission speed of IEEE 802.11n communication protocol has reached 600 Mbps and is capable of replacing wired transmission schemes for application devices having quality of service (QoS) requirements. Therefore, in prior art technique there has disclosed a connection type that uses a wireless communication technology to connect a docking station with a computer system and to replace the traditional wired connection.

As technology advances, wireless communication technologies now offer higher transmission speeds than ever. For example, the transmission speed of IEEE 802.11n communication protocol has reached 600 Mbps and is capable of replacing wired transmission schemes for application devices having quality of service (QoS) requirements. Therefore, in the prior art technique, there has been disclosed a connection type that uses a wireless communication technology to connect a docking station with a computer system and to replace the traditional wired connection.

However, in order to meet the QoS requirements in connecting the docking station with the computer system, the computer system cannot establish a link with the Internet simultaneously with the same wireless communication technology. Hence, the computer system has to include another set of a wireless transmission system to connect with the Internet and the docking station respectively, with different wireless transmission systems and different transmission bands. In this way, it requires that the computer system is implemented with an additional wireless transmission system and introduces additional manufacturing cost.

In another prior technique, a wireless transmission system is implemented with a time controller to control the network communication module to connect with the wireless network or the docking station at different points of time. Although in this embodiment the computer system only needs one network communication module to achieve the above object, the computer system cannot connect with both the Internet and the docking station and achieve the required QoS at the same time.

Therefore, it is necessary to provide a new wireless communication structure to overcome the deficiency encountered by the prior art techniques.

SUMMARY OF THE INVENTION

It is an object of the present invention to provide a wireless transmission system which is capable of distributing a plurality of streams.

It is an object of the present invention to provide a wireless transmission method.

It is still another object of the present invention to provide a computer system which comprises the wireless transmission system.

In order to achieve the above objects, the present invention discloses a computer system which comprises a wireless transmission system. The wireless transmission system comprises a control unit, a first transmission unit, a second transmission unit, a plurality of switches and a plurality of RF ends. The first transmission unit is electrically coupled with the control unit. The first transmission unit comprises a first transceiver module and a first MAC module. The second transmission unit is electrically coupled with the control unit. The second transmission unit comprises a second transceiver module and a second MAC module. The plurality of switches is electrically coupled with the control unit. The plurality of RF ends is electrically coupled with the plurality of switches respectively. The plurality of RF ends has a plurality of streams for transmitting a wireless signal. The control unit is provided for controlling the plurality of switches to connect the first transmission unit and the second transmission unit respectively with the plurality of RF ends to distribute the plurality of streams, and simultaneously controlling the first transceiver module and the second transceiver module to manage the plurality of streams.

The present invention discloses a wireless transmission method comprising the following steps: controlling a plurality of switches; distributing a plurality of streams to the first transmission unit and the second transmission unit; and managing the plurality of streams.

DETAILED DESCRIPTION OF THE PREFERRED EMBODIMENTS

The advantages and innovative features of the invention will become more apparent from the following detailed description when taken in conjunction with the accompanying drawings.

Figure 1:
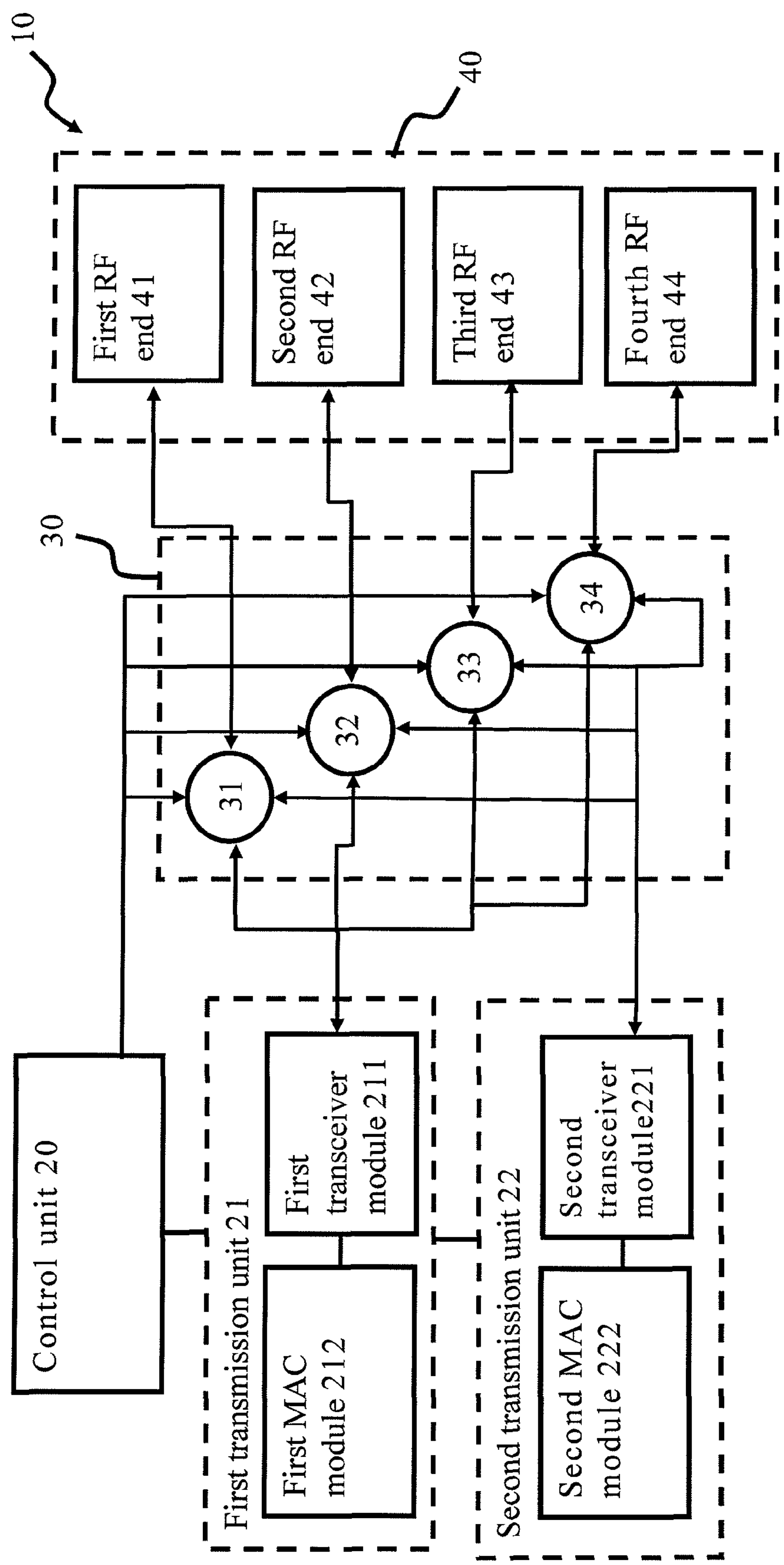
FIG. 1 illustrates a structural view of a wireless transmission system of the present invention.
Figure 2:
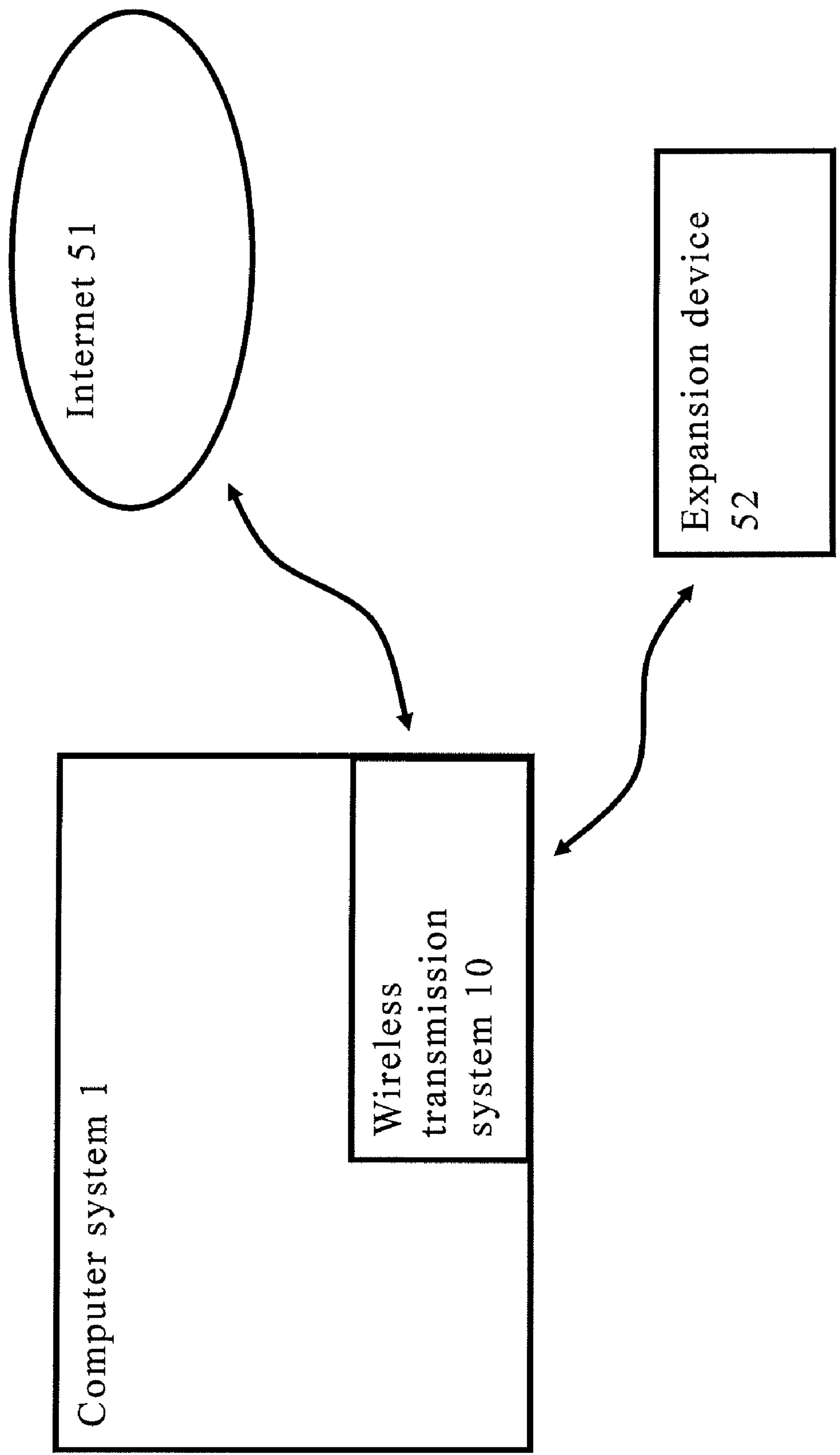
FIG. 2 illustrates a view of a computer system connecting with a wireless network of the present invention.

Please refer to FIG. 1 and FIG. 2 for views of a computer system in the present invention, wherein FIG. 1 illustrates a structural view of a wireless transmission system of the present invention, and FIG. 2 illustrates a view of the computer system connecting with a wireless network of the present invention.

In one embodiment of the present invention, a wireless transmission system 10 is a transmission system suitable for operating in a local area network (LAN). For example, the wireless transmission system 10 is based on the IEEE 802.11n wireless communication protocol. However, the wireless transmission system 10 can be based on other possible communication protocols. As shown in FIG. 2, the wireless transmission system 10 can be integrated in a computer system 1 to provide wireless transmission capabilities to the computer system 1 and to let the computer system 1 connect with the Internet 51 or other expansion device 52 via a wireless connection. In the embodiment, the expansion device 52 can be, but not limited to, a docking station.

As shown in FIG. 1, the wireless transmission system 10 comprises a control unit 20, a first transmission unit 21, a second transmission unit 22, a plurality of switches 30, and a plurality of RF ends 40 electrically coupled with each other.

The control unit 20 is used for controlling the transmission of the wireless transmission system 10 and the bandwidth required for transmission. The detailed operations of the control unit 20 will be described below.

The first transmission unit 21 comprises a first transceiver module 211 and a first media access control (MAC) module 212. The second transmission unit 22 comprises a second transceiver module 221 and a second MAC module 222. The first transceiver module 211 and the second transceiver module 221 are used for transmitting and controlling the signals to be transmitted from the computer system 1 via a wireless connection, and for managing a plurality of streams. The first MAC module 212 and the second MAC module 222 are provided for addressing and media access control of the wireless transmission system 10. The manners of executing addressing and media access control are known in the prior art and are widely adopted in all kinds of network communication devices. Therefore, they will not be further described.

The RF end 40 is used for directly transmitting wireless signals. In this embodiment, the wireless transmission system 10 comprises a first RF end 41, a second RF end 42, a third RF end 43, and a fourth RF end 44, but the wireless transmission system 10 can have any other number of RF ends 40. The first RF end 41, the second RF end 42, the third RF end 43, and the fourth RF end 44 each has their own stream respectively for transmitting wireless signals. In the present invention, the wireless transmission system 10 also includes a plurality of switches 30. The switches 30 can be, but not limited to, a multiplexer. The number of switches 30 corresponds to that of the RF ends 40. Therefore, in this embodiment, the wireless transmission system 10 comprises a first switch 31, a second switch 32, a third switch 33, and a fourth switch 34.

The control unit 20 controls the switches 30 to control the plurality of streams transmitted by the first transmission unit 21 and the second transmission unit 22, and manages the plurality of streams through the first transceiver module 211 and the second transceiver module 221. Hence the computer system 1 can be connected to the Internet 51 and the expansion device 52 simultaneously.

Figure 3:
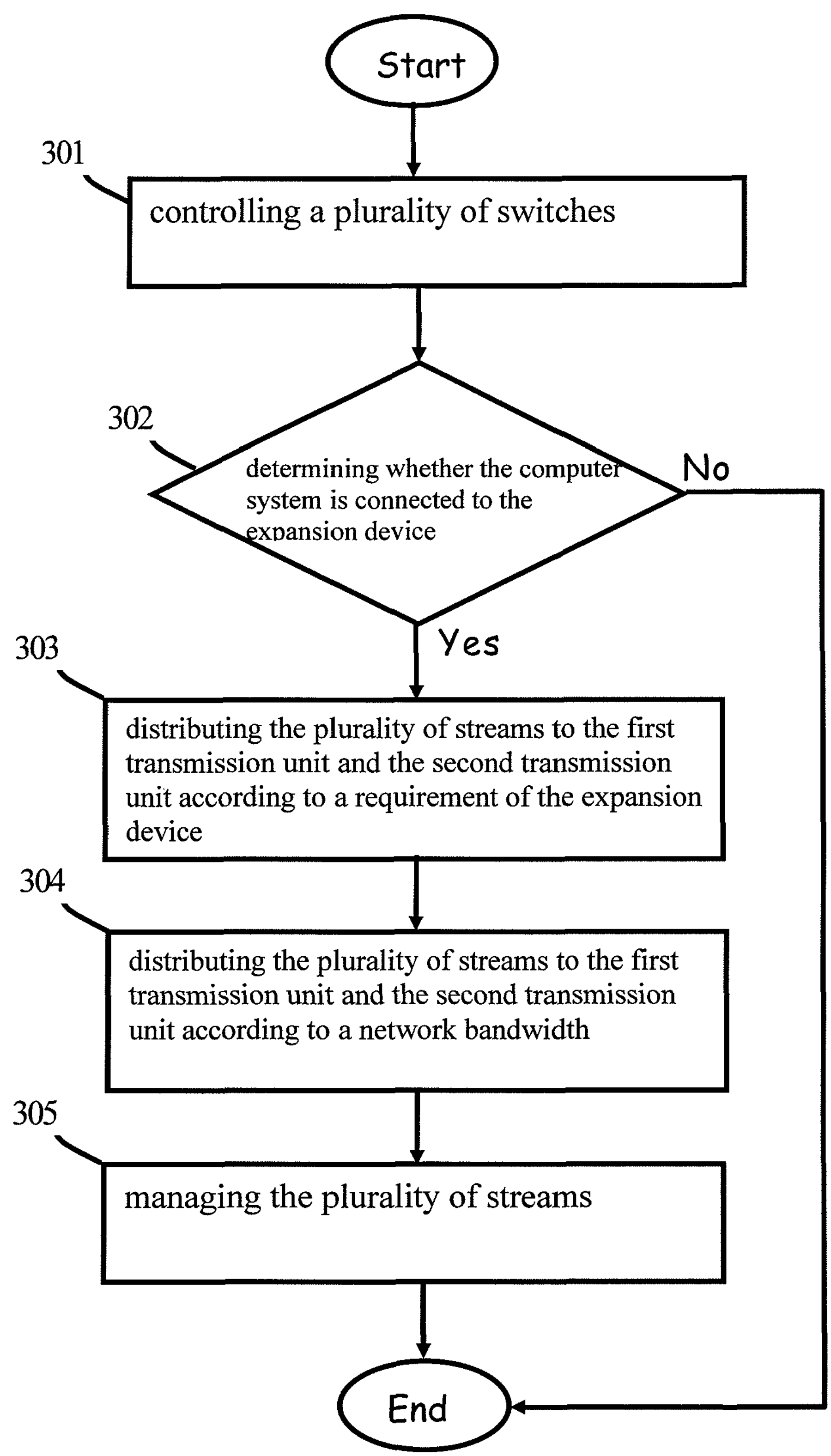
FIG. 3 illustrates a flow diagram of a wireless transmission method of the present invention.

Now please refer to FIG. 3 for a flow diagram of a wireless transmission method in the present invention. It is noted that although the present invention is illustrated by the computer system 1 comprising the wireless transmission system 10, the wireless transmission method can be applied in any other wireless transmission system other than the wireless transmission system 10.

Figure 4:
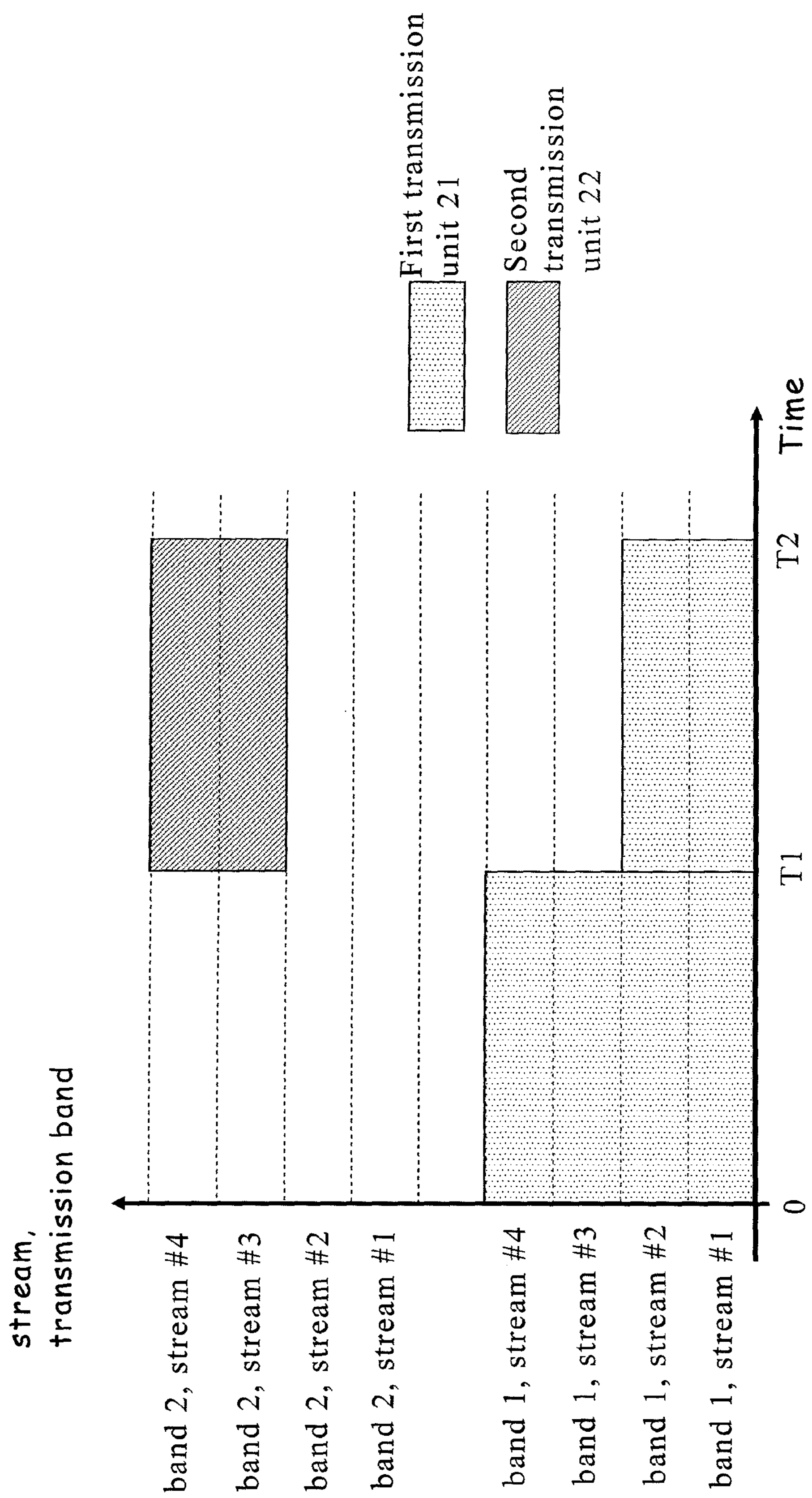
FIG. 4 illustrates a coordinate diagram of stream distribution vs. time of the wireless transmission system of the present invention.

Besides, please also refer to FIG. 4 for a coordinate diagram of stream distribution vs. time of the wireless transmission system 10 in the present invention.

The process of the present invention begins with step 301: controlling a plurality of switches.

When the wireless transmission system 10 is transmitting wireless signals, the control unit 20 first has to control the switches 30 to connect the first transmission unit 21 or the second transmission unit 22 with the RF ends 40 to transmit wireless signals.

For example as shown in FIG. 4 and assuming that the computer system 1 is only connected to the Internet 51 from the beginning time slot (that is 0.about.T1), the control unit 20 can let the RF ends 40 only connect with the first transmission unit 21. Therefore, the four sets of streams (stream #1, stream #2, stream #3, stream #4) provided by the first RF end 41, the second RF end 42, the third RF end 43, and the fourth RF end 44 are all distributed to the first transmission unit 21 for further use.

Then, the process proceeds to step 302: determining whether the computer system 1 is connected to the expansion device 52.

At this time, the control unit 20 determines whether the computer system 1 is connected to the expansion device 52. If yes, then the process proceeds to step 303; and if not, then the process is terminated.

Step 303: distributing the plurality of streams to the first transmission unit and the second transmission unit according to a requirement of the expansion device.

If the computer system 1 is connected to the expansion device 52, the control unit 20 would distribute the plurality of streams transmitted by the RF ends 40 immediately. According to the type of the expansion device 52, the control unit 20 determines the bandwidths for the first transmission unit 21 and the second transmission unit 22 respectively.

As shown in FIG. 4 and assuming the computer system 1 is connected to the Internet 51 and the expansion device 52 simultaneously during the time slot T1.about.T2, the control unit 20 is used for controlling the third switch 33 and the fourth switch 34 to connect the second transmission unit 22 with the third RF end 43 and the fourth RF end 44. In other words, the control unit 20 distributes the streams provided by the third RF end 43 and the fourth RF end 44 (that is stream #3 and stream #4) to the second transmission unit 22 for using with the expansion device 52. The streams provided by the first RF end 41 and the second RF end 42 (that is stream #1 and stream #2) are still distributed by the first transmission unit 21 and are linked with the Internet 51. Therefore, the computer system 1 can be connected to the Internet 51 and the expansion device 52 simultaneously.

On the other hand, in order to avoid interferences between wireless signals, the control unit 20 can change the transmission bands used by the third RF ends 43 and the fourth RF end 44. As shown in FIG. 4, during the time slot of T1~T2, the second transmission unit 22 transmits wireless signals via a transmission band 2.

The process then proceeds to step 304: distributing the plurality of streams to the first transmission unit and the second transmission unit according to a network bandwidth.

Aside from distributing the plurality of streams according to the requirement of the expansion device 52 as described in step 303, the control unit 20 can also distribute streams according to the network bandwidth. For example, when the computer system 1 is moved to a place with less available wireless network bandwidth, the control unit 20 would increase the number of streams distributed to the second transmission unit 22 to ensure smooth connection between the computer system 1 and the expansion device 52.

Finally in step 305: managing the plurality of streams.

After the distribution of streams is determined, the control unit 20 controls the first transceiver module 211 and the second transceiver module 221 to manage the plurality of streams. Therefore, the first transceiver module 211 and the second transceiver module 221 can transmit and control wireless signals with distributed streams respectively so as to avoid interferences in the signal transmission of the wireless transmission system 10.

It is noted that the order of the wireless transmission method disclosed in the present invention is not limited to that described above, and other orders can be applied in the present invention to achieve the objects of the present invention.

Using the wireless transmission system 10 and the wireless transmission method disclosed in the present invention, the computer system 1 can be connected to the Internet 51 and the expansion device 52 simultaneously. When the expansion device 52 is a docking station requiring a high quality of service (QoS), the present invention can also achieve the object of providing high QoS without adding another set of wireless transmission system 10.

It is noted that the above-mentioned embodiments are only for illustration, and it is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A wireless transmission system comprising:

a control unit;

a first transmission unit electrically coupled with the control unit, with the first transmission unit comprising a first transceiver module and a first Media Access Control (MAC) module;

a second transmission unit electrically coupled with the control unit, with the second transmission unit comprising a second transceiver module and a second MAC module, with the first and second transmission units operating in a single communication protocol;

a plurality of switches electrically coupled with the control unit;

a plurality of RF ends electrically with plurality of switches respectively, wherein the plurality of RF ends has a plurality of streams for transmitting a wireless signal; with the control unit controlling the plurality of switches according to a requirement to connect the first transmission unit and the second transmission unit with the plurality of RF ends respectively to distribute the plurality of streams, and controlling the first transceiver module and the second transceiver module to manage the plurality of streams; and an expansion device in wireless connection to the plurality of RF ends, wherein the expansion device has the requirement, wherein the control unit further determines whether the expansion device is connected and distributes the plurality of streams to the first transmission unit and the second transmission unit according to the requirement of the expansion device.

2. The wireless transmission system as claimed in claim 1, wherein the expansion device comprises a docking station.

3. The wireless transmission system as claimed in claim 1, wherein the control unit distributes the plurality of streams to the first transmission unit and the second transmission unit according to the requirement and a network bandwidth.

4. The wireless transmission system as claimed in claim 1, wherein the plurality of RF ends comprises four sets of RF ends.

5. A wireless transmission method for a wireless transmission system, the wireless transmission system comprising a first transmission unit and a second transmission unit operating in a single communication protocol, the method comprising:

controlling a plurality of switches;

determining whether an expansion device having a requirement is connected, and if yes, then distributing a plurality of streams to the first transmission unit and the second transmission unit by the plurality of switches according to the requirement of the expansion device; and managing the plurality of streams.

6. The wireless transmission method as claimed in claim 5, further comprising:

distributing the plurality of streams to the first transmission unit and the second transmission unit according to the requirement and a network bandwidth.

7. A computer system comprising a wireless transmission system for connecting with an internet and an expansion device, the wireless transmission system comprising:

a control unit;

a first transmission unit electrically coupled with the control unit and the internet, with the first transmission unit comprising a first transceiver module and a first Media Access Control (MAC) module;

a second transmission unit electrically coupled with the control unit and the expansion device, with the second transmission unit comprising a second transceiver module and a second MAC module, with the first and second transmission units operating in a single communication protocol;

a plurality of switches electrically coupled with the control unit; and a plurality of RF ends electrically coupled with a plurality of switches respectively, wherein the plurality of RF ends has a plurality of streams for transmitting a wireless signal; with the control unit, according to a requirement of the expansion device, controlling the plurality of switches to connect the first transmission unit and the second transmission unit with the plurality of RF ends respectively to distribute the plurality of streams, and controlling the first transceiver module and the second transceiver module to manage the plurality of streams.

8. The wireless transmission system as claimed in claim 7, wherein the expansion device comprises a docking station.

9. The wireless transmission system as claimed in claim 7, wherein the control unit further distributes the plurality of streams to the first transmission unit and the second transmission unit according to a network bandwidth.

10. The wireless transmission system as claimed in claim 7, wherein the plurality of RF ends comprises four sets of RF ends.

* * * * *